US011325190B2

(12) United States Patent
Morita et al.

(10) Patent No.: US 11,325,190 B2
(45) Date of Patent: May 10, 2022

(54) ADDITIVE MANUFACTURING METHOD AND MACHINING-PATH GENERATION METHOD

(71) Applicant: Mitsubishi Electric Corporation, Tokyo (JP)

(72) Inventors: Daiji Morita, Tokyo (JP); Nobuhiro Shinohara, Tokyo (JP); Satoshi Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/281,990

(22) PCT Filed: Oct. 18, 2018

(86) PCT No.: PCT/JP2018/038884
§ 371 (c)(1),
(2) Date: Apr. 1, 2021

(87) PCT Pub. No.: WO2020/079816
PCT Pub. Date: Apr. 23, 2020

(65) Prior Publication Data
US 2021/0316368 A1     Oct. 14, 2021

(51) Int. Cl.
*B33Y 10/00* (2015.01)
*B23K 26/34* (2014.01)
(Continued)

(52) U.S. Cl.
CPC .............. *B22F 10/80* (2021.01); *B22F 10/28* (2021.01); *B23K 26/342* (2015.10); *B33Y 10/00* (2014.12); *B33Y 50/00* (2014.12)

(58) Field of Classification Search
CPC .. B23K 26/34–342; B33Y 10/00; B33Y 30/00
See application file for complete search history.

(56) References Cited

U.S. PATENT DOCUMENTS 6,347,257 B1 * 2/2002 Bedal ...................... B29C 41/12
                                                            700/119
9,126,287 B2 * 9/2015 Bruck ................ B23K 35/0244
(Continued)

FOREIGN PATENT DOCUMENTS

EP       2554318 A1     2/2013
JP       5-309404 A    11/1993
(Continued)

OTHER PUBLICATIONS

International Search Report and Written Opinion dated Dec. 25, 2018, received for PCT Application PCT/JP2018/038884, Filed on Oct. 18, 2018, 7 pages including English Translation.
(Continued)

*Primary Examiner* — Michael A Laflame, Jr.
(74) *Attorney, Agent, or Firm* — Xsensus LLP

(57) ABSTRACT

An additive manufacturing method includes: forming first and second linear beads parallel to each other under a same predetermined formation condition such that a gap having a predetermined width is formed between the first and second linear beads; forming a third linear bead in the gap under the same formation condition; forming, after forming the third linear bead, the linear bead that is formed as an even-numbered line under the formation condition such that the linear bead is parallel to the first linear bead and a gap having a predetermined width is formed between the linear bead formed as an even-numbered line and a linear bead formed two lines before; and forming, after forming the third linear bead, the linear bead that is formed as an odd-numbered line in the gap between the linear bead formed immediately before and the linear bead formed three lines before under the formation condition.

4 Claims, 12 Drawing Sheets

(51) Int. Cl.
  *B22F 10/80* (2021.01)
  *B33Y 50/00* (2015.01)
  *B23K 26/342* (2014.01)
  *B22F 10/28* (2021.01)

(56) References Cited

U.S. PATENT DOCUMENTS

| | | | |
|---|---|---|---|
| 10,239,263 B2 | 3/2019 | Araie et al. | |
| 10,500,641 B2 | 12/2019 | McClelland et al. | |
| 2005/0109818 A1 | 5/2005 | Shimohata et al. | |
| 2011/0226390 A1* | 9/2011 | Chen | B23K 35/0261 |
| | | | 148/527 |
| 2016/0200051 A1* | 7/2016 | Urbanic | B29C 64/40 |
| | | | 264/308 |
| 2018/0022031 A1* | 1/2018 | Ishii | B29C 64/386 |
| | | | 156/235 |
| 2018/0147669 A1 | 5/2018 | Narayanan et al. | |
| 2018/0373227 A1* | 12/2018 | Sadusk | G05B 19/4099 |
| 2020/0070247 A1 | 3/2020 | McClelland et al. | |

FOREIGN PATENT DOCUMENTS

| | | |
|---|---|---|
| JP | 4551082 B2 | 9/2010 |
| JP | 2016-74132 A | 5/2016 |
| JP | 2016-196012 A | 11/2016 |
| JP | 2018-502216 A | 1/2018 |
| JP | 2018-87379 A | 6/2018 |

OTHER PUBLICATIONS

Extended European Search Report dated May 6, 2020, received for EP Application 18900558.0, 2019, 8 pages.

Decision to Grant dated Jun. 4, 2019, received for JP Application 2019-512695, 5 pages including English Translation.

* cited by examiner

FIG.15

| MANAGE-MENT-NUMBER | MECHANICAL PARAMETER | | | | | | BEAD DATA | | |
|---|---|---|---|---|---|---|---|---|---|
| | BEAM DIAMETER | SHAFT FEED RATE | WIRE SUPPLY VOLUME RATE | LASER OUTPUT | WIRE ANGLE | | BEAD WIDTH | BEAD HEIGHT | BEAD TENDENCY |
| | [mm] | [mm/min] | [cc/h] | [W] | [deg] | | [mm] | [mm] | S: STUB, O: OK, D: DROP |
| 1 | 3.0 | 133 | 25 | 1500 | 45.00 | | 3 | 0.4 | O |
| 2 | 3.0 | 133 | 30 | 1500 | 45.00 | | 3 | 0.6 | S |
| · | × | × | · | · | × | | × | · | · |
| · | · | · | · | × | · | | · | × | · |
| × | · | · | × | · | · | | · | · | · |
| 1000 | 3.6 | 300 | 50 | 2000 | 60 | | 3.4 | 0.3 | D |

61

ADDITIVE MANUFACTURING METHOD AND MACHINING-PATH GENERATION METHOD

CROSS-REFERENCE TO RELATED APPLICATION

The present application is based on PCT filing PCT/JP2018/038884, filed Oct. 18, 2018, the entire contents of which are incorporated herein by reference.

FIELD

The present invention relates to an additive manufacturing method for additively manufacturing a three-dimensional object and also to a machining-path generation method for generating a machining path for the additive manufacturing.

BACKGROUND

A technique of manufacturing a three-dimensional object referred to as "AM (Additive Manufacturing)" has been conventionally well-known. There are multiple types of additive manufacturing methods including a DED (Directed Energy Deposition) method. The DED method has the advantages over other laminating methods, such as a shorter manufacturing time, easier changeover of laminating materials, and less limitation to the base-material type. The DED method only needs nearly the amount of material to be used for manufacturing and thus reduces the waste of material. Further, powder and wire can both be made available for use as materials by changing the machining head configuration. In particular, ready-made welding wires can be used for the wire, and the wire is thus commercially readily available at low cost.

As a technique of forming a laminated portion by laminating a molten material on a base material in the same manner as the DED method, Patent Literature 1 discloses a welding method that includes forming a plurality of laminated portions with a gap between the laminated portions, forming laminated portions in the gaps to form a first laminated body, forming a plurality of laminated portions with respect to the first laminated body with a gap between the laminated portions, and forming laminated portions in the gaps to form a second laminated body.

CITATION LIST

Patent Literature

Patent Literature 1: Japanese Patent No. 4551082

SUMMARY

Technical Problem

However, in the method described in Patent Literature 1 mentioned above, the second laminated body is formed after the entire first laminated body has been formed. Thus, at the time of forming the second laminated body, the first laminated body has already been cooled. For this reason, even when the first laminated body and the second laminated body are formed under the same conditions, there is still a significant difference in temperature between a target surface on which the first laminated body is formed and a target surface on which the second laminated body is formed. If there is a significant difference in temperature between these target surfaces, variations in shape and height of the laminated bodies formed become large. Accordingly, even if the method described in Patent Literature 1 is applied to the additive manufacturing, it is still difficult to improve the shape accuracy of a manufactured object.

The present invention has been achieved to solve the above problems, and an object of the present invention is to provide an additive manufacturing method by which it is possible to improve the shape accuracy of a manufactured object.

Solution to Problem

In order to solve the above problems and achieve the object, an additive manufacturing method according to an aspect of the present invention is an additive manufacturing method for manufacturing a three-dimensional object by laminating a linear bead on a target surface. The additive manufacturing method includes: a step of forming a first linear bead and a second linear bead parallel to each other under a same predetermined formation condition such that a gap having a predetermined width is formed between the first linear bead and the second linear bead; and a step of forming a third linear bead in the gap under the same formation condition. Moreover, the additive manufacturing method includes: a step of forming, after forming the third linear bead, the linear bead that is formed as an even-numbered line under the formation condition such that the linear bead is parallel to the first linear bead and a gap having a predetermined width is formed between the linear bead formed as an even-numbered line and a linear bead formed two lines before; and a step of forming, after forming the third linear bead, the linear bead that is formed as an odd-numbered line in the gap between the linear bead formed immediately before and the linear bead formed three lines before under the formation condition.

Advantageous Effects of Invention

The additive manufacturing method according to the present invention has an effect where it is possible to improve the shape accuracy of a manufactured object.

BRIEF DESCRIPTION OF DRAWINGS

FIG. 15 is a diagram illustrating an example of a process map referenced by the machining-path generation unit illustrated in FIG. 2.

DESCRIPTION OF EMBODIMENTS

An additive manufacturing method and a machining-path generation method according to embodiments of the present invention will be described below in detail with reference to the accompanying drawings. The present invention is not limited to the embodiments.

First Embodiment

Figure 1:
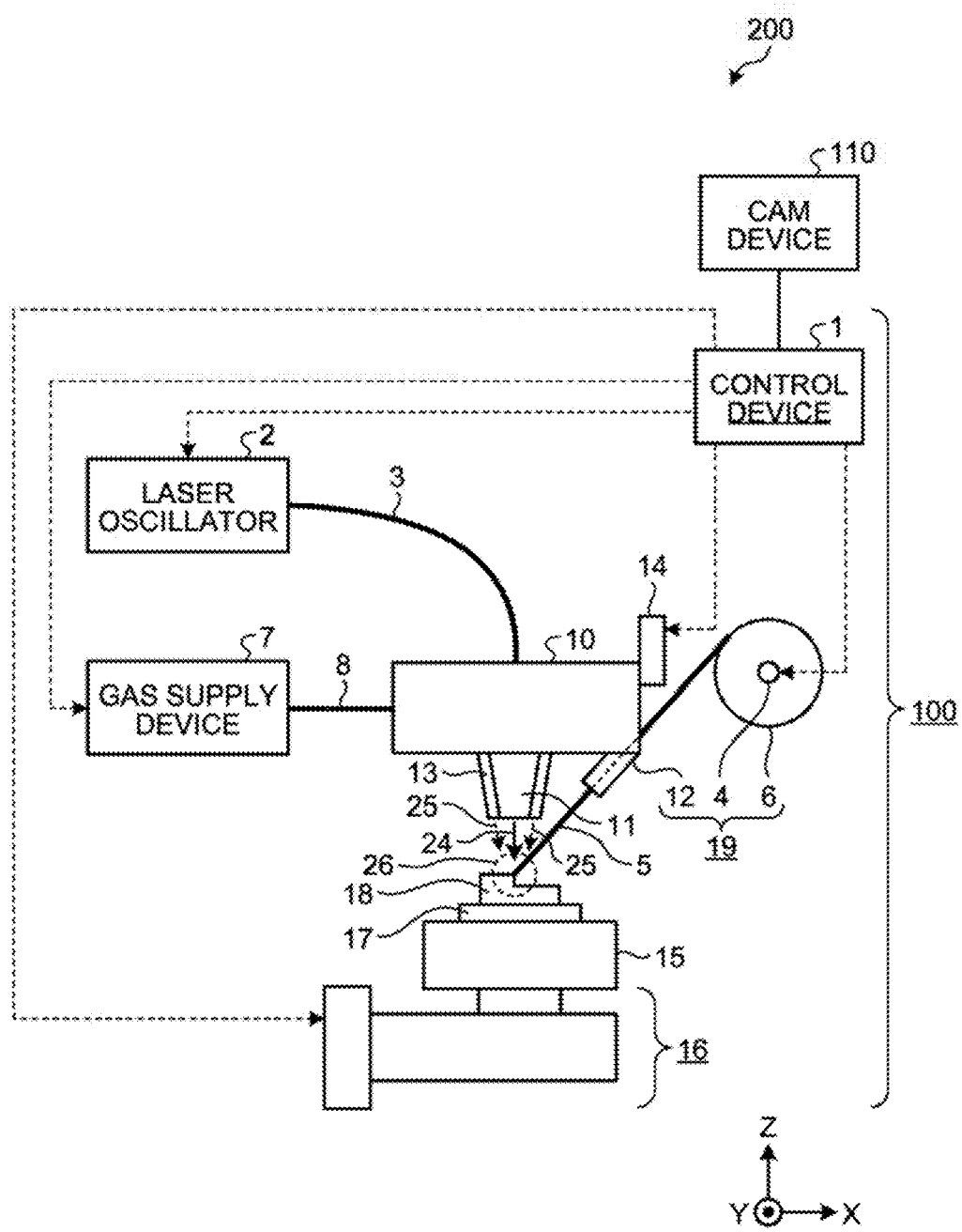
FIG. 1 is a diagram illustrating a configuration of an additive manufacturing system according to a first embodiment of the present invention.
Figure 2:
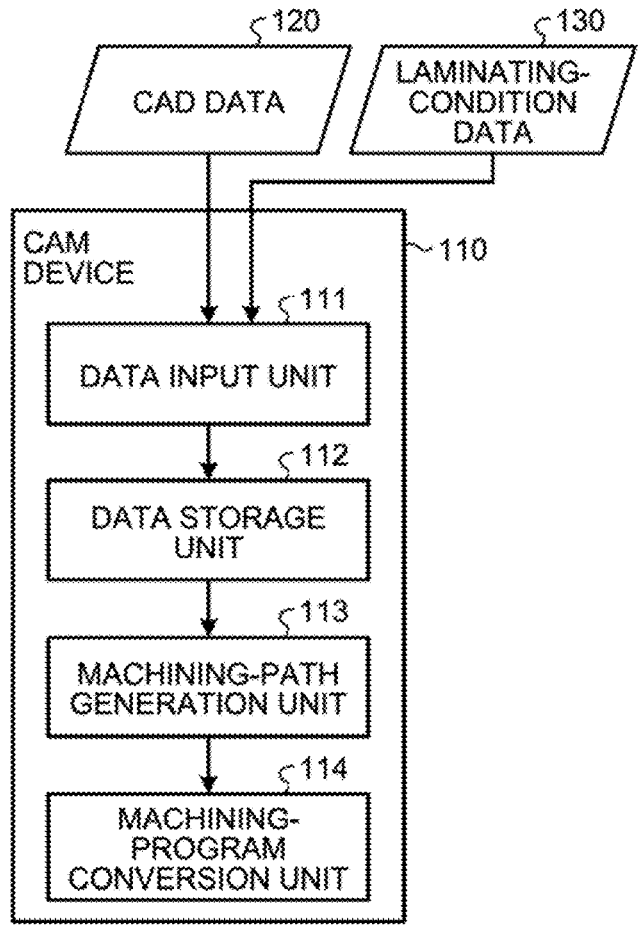
FIG. 2 is a block diagram illustrating a configuration of a CAM device according to the first embodiment of the present invention.

FIG. 1 is a diagram illustrating a configuration of an additive manufacturing system 200 according to a first embodiment of the present invention. FIG. 2 is a block diagram illustrating a configuration of a CAM (Computer Aided Manufacturing) device 110 according to the first embodiment of the present invention. An additive manufacturing device 100 is an additive manufacturing device that uses the DED method to manufacture a three-dimensional object by performing additive machining for adding a material melted by beam irradiation onto a target surface of a workpiece. In the first embodiment, the beam refers to a laser beam 24 and the material refers to a wire 5 that is made of metal and is a wire-like build material. The wire-like build material may also be a material other than a metal material.

The additive manufacturing system 200 includes the additive manufacturing device 100 and the CAM device 110.

The additive manufacturing device 100 deposits a bead on a base material 17 so as to form a deposit 18 made of metal material on the surface of the base material 17. The bead is a substance formed by solidification of the molten wire 5 and makes up the deposit 18. In the first embodiment, a linear bead is formed. The linear bead is hereinafter referred to as "line bead". That is, the line bead is linear metal formed by solidification of the molten wire 5. The base material 17 is placed on a stage 15. The workpiece refers to the base material 17 and the deposit 18. The manufactured object refers to the base material 17 and the deposit 18 after addition of a material in accordance with a machining program. The base material 17 illustrated in FIG. 1 is a plate. The base material 17 may also be a material other than a plate.

The additive manufacturing device 100 includes a machining head 10 including a beam nozzle 11, a wire nozzle 12, and a gas nozzle 13. The beam nozzle 11 emits the laser beam 24 toward a machining region of a workpiece. The laser beam 24 is a heat source to melt a material. The wire nozzle 12 advances the wire 5 toward the irradiation position of the laser beam 24 on a workpiece. That is, the wire nozzle 12 supplies the wire 5 toward the machining region of a workpiece. It is also possible for the additive manufacturing device 100 to employ a manufacturing method that sprays powder metal as a build material from the wire nozzle 12.

The gas nozzle 13 sprays shield gas 25 toward the machining region of a workpiece in order to suppress oxidization of the deposit 18 and cool the line bead. The beam nozzle 11, the wire nozzle 12, and the gas nozzle 13 are fixed to the machining head 10 so that the positional relation between these nozzles is uniquely defined. That is, the relative positional relation between the beam nozzle 11, the gas nozzle 13, and the wire nozzle 12 is fixed by the machining head 10.

A laser oscillator 2 oscillates the laser beam 24. The laser oscillator 2 is a beam source. The laser beam 24 from the laser oscillator 2 passes through a fiber cable 3 that is an optical transmission path, and then propagates to the beam nozzle 11. An irradiation unit is configured from the laser oscillator 2, the fiber cable 3, and the beam nozzle 11. The irradiation unit irradiates a workpiece with the laser beam 24 that melts the wire 5 such that the laser beam 24 is non-coaxial with the central axis of the wire 5. A gas supply device 7 supplies gas to the gas nozzle 13 through a pipe 8. A gas supply unit is configured from the gas supply device 7, the pipe 8, and the gas nozzle 13. The gas supply unit sprays the shield gas 25 to a machining region 26.

The wire 5 is wound around a wire spool 6 that serves as a material supply source. A rotational motor 4 is a servo motor. As the rotational motor 4 is driven, the wire spool 6 rotates and thus the wire 5 is fed from the wire spool 6. The wire 5 having been fed from the wire spool 6 passes through the wire nozzle 12, and is supplied to the irradiation position of the laser beam 24. A wire supply unit 19 is configured from the rotational motor 4, the wire spool 6, and the wire nozzle 12.

A head drive device 14 moves the machining head 10 in each of an X-axis direction, a Y-axis direction, and a Z-axis direction. These three axes, i.e., the X-axis, the Y-axis, and the Z-axis, are perpendicular to one another. The X-axis and the Y-axis extend parallel to the horizontal direction. The Z-axis direction refers to the vertical direction. The head drive device 14 includes a servo motor that constitutes an operational mechanism to move the machining head 10 in the X-axis direction, a servo motor that constitutes an operational mechanism to move the machining head 10 in the Y-axis direction, and a servo motor that constitutes an operational mechanism to move the machining head 10 in the Z-axis direction. The head drive device 14 is an operational mechanism that enables transitional motion of the machining head 10 in each of the three axial directions. In FIG. 1, illustrations of the respective servo motors are omitted. In the additive manufacturing device 100, the head drive device 14 moves the machining head 10 so as to move the irradiation position of the laser beam 24 on a workpiece.

In the machining head 10 illustrated in FIG. 1, the beam nozzle 11 advances the laser beam 24 in the Z-axis direction. The wire nozzle 12 is located apart from the beam nozzle 11 on the X-Y plane. The wire nozzle 12 advances the wire 5 in an oblique direction relative to the Z-axis. That is, the wire nozzle 12 advances the wire 5 non-coaxially with the laser beam 24 emitted from the beam nozzle 11. The wire nozzle 12 is used to limit the advancement of the wire 5 such that the wire 5 is supplied to a desired position.

In the machining head 10 illustrated in FIG. 1, the gas nozzle 13 is provided on the outer peripheral side of the beam nozzle 11 on the X-Y plane such that it is coaxial with the beam nozzle 11. The gas nozzle 13 sprays gas along the central axis of the laser beam 24 emitted from the beam nozzle 11. That is, the beam nozzle 11 and the gas nozzle 13 are located coaxially with each other.

A rotational mechanism 16 is an operational mechanism that enables the stage 15 to rotate about a first shaft and to rotate about a second shaft perpendicular to the first shaft. In the rotational mechanism 16 illustrated in FIG. 1, the first shaft is an A shaft extending parallel to the X-axis, and the second shaft is a C shaft extending parallel to the Z-axis. The rotational mechanism 16 includes a servo motor that constitutes an operational mechanism to rotate the stage 15 about the first shaft, and a servo motor that constitutes an operational mechanism to rotate the stage 15 about the second shaft. The rotational mechanism 16 is an operational mechanism that enables rotational motion of the stage 15 about each of the two axes. In FIG. 1, illustrations of the respective servo motors are omitted. In the additive manufacturing device 100, the rotational mechanism 16 rotates the stage 15 to thereby change the attitude or position of a workpiece. By using the rotational mechanism 16, the additive manufacturing device 100 can shape a workpiece into even a complex tapered shape.

A control device 1 controls the additive manufacturing device 100 in accordance with a machining program transmitted from the CAM device 110. By indicating a movement path along which the machining head 10 is moved relative to a workpiece placed on the stage 15, the machining program specifies a machining path to manufacture a three-dimensional object. The machining path is a path along which the irradiation position of the laser beam 24 is moved.

The control device 1 controls the wire supply unit 19, the irradiation unit, and the gas supply unit so as to execute control for manufacturing an object from a plurality of line beads formed by melting the wire 5. For example, a numerical control device is used as the control device 1. The control device 1 outputs a movement command to the head drive device 14 so as to control drive of the head drive device 14 and move the machining head 10. The control device 1 outputs a command to the laser oscillator 2 in accordance with beam-output conditions to control laser oscillation by the laser oscillator 2.

The control device 1 outputs, to the rotational motor 4, a command that is in accordance with conditions for the material supply amount so as to control drive of the rotational motor 4. The control device 1 controls drive of the rotational motor 4 so as to adjust the supply rate of the wire 5 to be fed from the wire spool 6 toward the irradiation position. In the following descriptions, this rate is sometimes referred to as "wire supply volume rate".

The control device 1 outputs, to the gas supply device 7, a command that is in accordance with conditions for the gas supply amount to control the amount of the shield gas 25 to be supplied from the gas supply device 7 to the gas nozzle 13. The control device 1 outputs a rotational command to the rotational mechanism 16 so as to control drive of the rotational mechanism 16. That is, the control device 1 outputs various types of commands to thereby control the additive manufacturing device 100 in its entirety.

The head drive device 14 and the rotational mechanism 16 are operated in conjunction with each other to actuate the machining head 10 and the stage 15, so that the position of the machining region 26 can be changed and thus a manufactured object with a desired shape can be obtained.

A hardware configuration of the control device 1 is described here. The control device 1 illustrated in FIG. 1 is implemented by hardware executing a control program that is a program for controlling the additive manufacturing device 100 according to the first embodiment.

Figure 3:
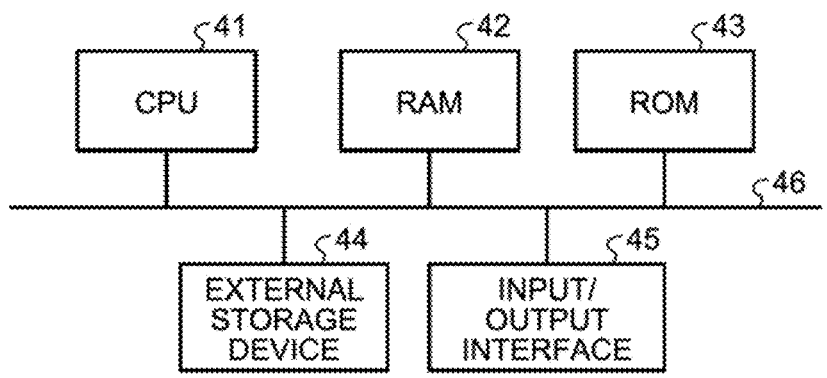
FIG. 3 is a block diagram illustrating a hardware configuration of a control device according to the first embodiment of the present invention.

FIG. 3 is a block diagram illustrating a hardware configuration of the control device 1 according to the first embodiment of the present invention. The control device 1 includes a CPU (Central Processing Unit) 41 executing various types of processing, a RAM (Random Access Memory) 42 including a data storage area, a ROM (Read Only Memory) 43 that is a nonvolatile memory, an external storage device 44, and an input/output interface 45 that inputs and outputs information to and from the control device 1. The units illustrated in FIG. 3 are connected to each other through a bus 46.

The CPU 41 executes programs stored in the ROM 43 and the external storage device 44. The additive manufacturing device 100 is controlled in its entirety by the control device 1 using the CPU 41.

The external storage device 44 is an HDD (Hard Disk Drive) or an SSD (Solid State Drive). The external storage device 44 stores therein the control program and various types of data. The ROM 43 has stored therein a boot loader that is software or a program to control the hardware, such as a BIOS (Basic Input/Output System) or a UEFI (Unified Extensible Firmware Interface) that is a basic control program for a computer or controller that is the control device 1. It is allowable that the control program is stored in the ROM 43.

The programs stored in the ROM 43 and the external storage device 44 are loaded to the RAM 42. The CPU 41 loads the control program into the RAM 42 to perform various types of processing. The input/output interface 45 is a connection interface connected with devices outside the control device 1. A machining program is input to the input/output interface 45. The input/output interface 45 outputs various types of commands. It is allowable that the control device 1 includes an input device, such as a keyboard and a pointing device, and an output device, such as a display.

The control program may be a program stored in a computer-readable storage medium. It is allowable that the control device 1 stores, into the external storage device 44, the control program that has been stored in the storage medium. The storage medium may be a portable storage medium that is a flexible disk or may be a flash memory that is a semiconductor memory. It is also allowable to install a control program from another computer or a sever device on the computer or the controller that serves as the control device 1 through a communication network.

The functions of the control device 1 may be implemented by a processing circuit that is hardware dedicated to controlling the additive manufacturing device 100. The processing circuit is a single circuit, a complex circuit, a programmed processor, a parallel-programmed processor, an ASIC (Application Specific Integrated Circuit), an FPGA (Field Programmable Gate Array), or a combination thereof. The functions of the control device 1 may be partially implemented by hardware, while being partially implemented by software or firmware.

The CAM device 110 is a machining-program generation device that generates a machining program to control operation of the additive manufacturing device 100. The CAM device 110 includes a data input unit 111, a data storage unit 112, a machining-path generation unit 113, and a machining-program conversion unit 114. The respective constituent units of the CAM device 110 are capable of transmitting and receiving information to and from each other.

The data input unit 111 receives CAD (Computer-Aided Design) data 120 that is manufacturing-shape data input to the CAM device 110 from a device external to the CAM device 110, and transmits the CAD data 120 to the data storage unit 112. The manufacturing-shape data includes information on a manufacturing-target shape that is a finished shape of a manufactured object additively manufactured by the additive manufacturing device 100 and includes information on the raw-material type. The manufacturing-target shape is a final three-dimensional shape. The manufacturing-shape data is not limited to the CAD data 120. It is sufficient if the manufacturing-shape data is at least data interpretable at the CAM device 110.

The data input unit 111 receives reference-line-bead formation information input by a user and transmits the received information to the data storage unit 112. This information indicates conditions for forming a reference line bead. The reference line bead is a line bead that serves as a reference for a line bead formed by additive machining in the additive manufacturing device 100. The reference-line-bead formation information indicates a shape of the reference line bead and is used to generate a machining program described below. The reference-line-bead formation information includes information on the width of the reference line bead, information on the height of the reference line bead, and information on the pitch width of the reference line bead. The information on the pitch width indicates the pitch width between adjacent reference line beads. The pitch width between adjacent reference line beads refers to the distance between the respective central axes of the adjacent reference line beads in the width direction of the reference line beads.

The data storage unit 112 stores therein the manufacturing-shape data transmitted from the data input unit 111.

The machining-path generation unit 113 receives the CAD data 120 transmitted from the data input unit 111. By analyzing the CAD data 120 and the reference-line-bead formation information, the machining-path generation unit 113 generates and transmits a machining path to the machining-program conversion unit 114. The reference-line-bead formation information is laminating-condition data to be used to control lamination of the reference line beads. The machining program specifies a machining path by indicating the route of the machining head 10 intended to form the reference line bead.

The machining-program conversion unit 114 receives the machining-path information transmitted from the machining-path generation unit 113. The machining-program conversion unit 114 converts the machining-path information generated by the machining-path generation unit 113 into a machining program, and transmits the machining program to the control device 1.

The CAM device 110 illustrated in FIG. 2 is implemented by hardware having the configuration as illustrated in FIG. 3 executing a control program that is a program for controlling the CAM device 110. The functions of the CAM device 110 may be implemented by a processing circuit that is hardware dedicated to controlling the CAM device 110.

Figure 4:
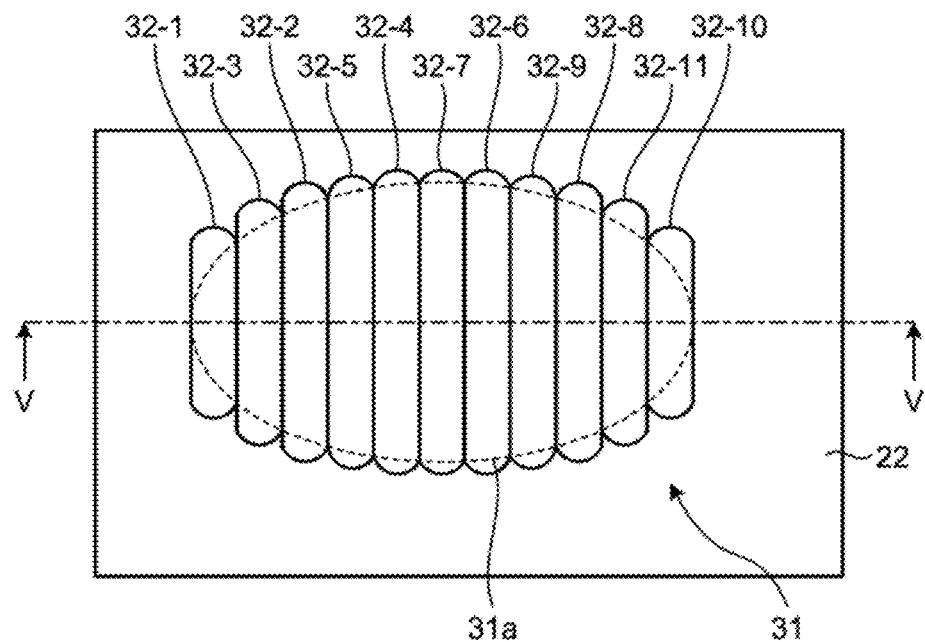
FIG. 4 is a schematic top view illustrating a deposit formed on a target surface by additive machining performed by an additive manufacturing device illustrated in FIG. 1.
Figure 5:
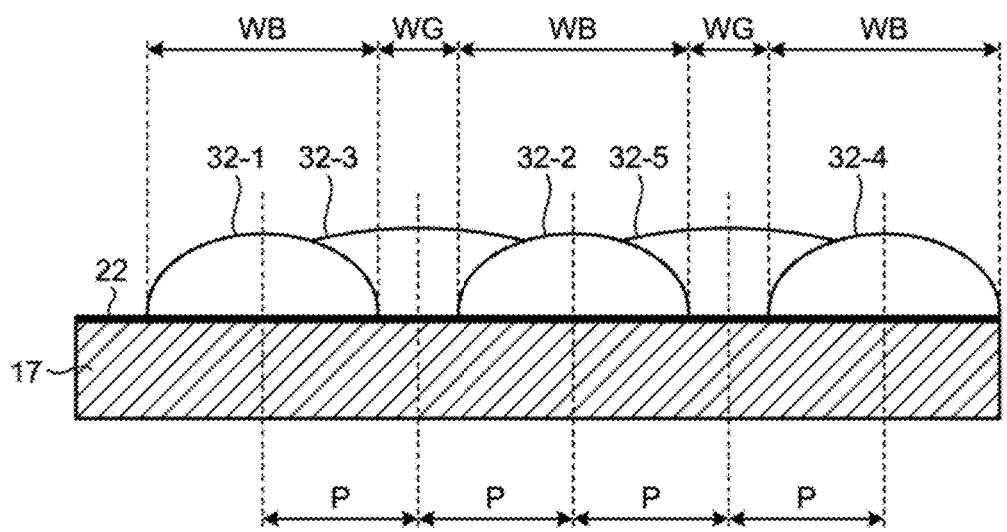
FIG. 5 is a schematic cross-sectional view of relevant parts taken along line V-V in FIG. 4, and illustrating the deposit formed on the target surface by additive machining performed by the additive manufacturing device illustrated in FIG. 1.

Next, additive machining in the additive manufacturing device 100 according to the first embodiment is described. FIG. 4 is a schematic top view illustrating a deposit 31 formed on a target surface 22 by additive machining performed by the additive manufacturing device 100 illustrated in FIG. 1. FIG. 5 is a schematic cross-sectional view of relevant parts taken along line V-V in FIG. 4 and illustrating the deposit 31 formed on the target surface 22 by additive machining performed by the additive manufacturing device 100 illustrated in FIG. 1. FIG. 5 illustrates a cross-sectional view of the deposit 31 when viewed along its width direction perpendicular to the longitudinal direction of a line bead 32. FIG. 4 illustrates, by a dotted line, the shape of a manufacturing-target shape 31$a$ that is the shape of the deposit 31.

As illustrated in FIGS. 4 and 5, the deposit 31 formed on the target surface 22 is made up of a first line bead 32-1, a second line bead 32-2, a third line bead 32-3, a fourth line bead 32-4, a fifth line bead 32-5, a sixth line bead 32-6, a seventh line bead 32-7, an eighth line bead 32-8, a ninth line bead 32-9, a tenth line bead 32-10, and an eleventh line bead 32-11. Eleven line beads 32 including the first line bead 32-1 to the eleventh line bead 32-11 are formed parallel to each other within the plane of the target surface 22, and each line bead is joined to the adjacent line beads without a gap.

The line beads 32 including the first line bead 32-1 to the eleventh line bead 32-11 are formed such that they contain the manufacturing-target shape of the deposit 31 within the plane of the target surface 22 in the longitudinal directions of the respective line beads 32. That is, the line beads 32 including the first line bead 32-1 to the eleventh line bead 32-11 are formed such that each of them protrudes from the manufacturing-target shape in its longitudinal direction. A redundant portion of each of the line beads 32, which protrudes from the manufacturing-target shape, is a portion to be removed after manufacturing an object with a desired shape.

Next, descriptions are given of the formation sequence of the line beads 32 when the deposit 31 is formed by additive machining performed by the additive manufacturing device 100. The additive manufacturing method according to the first embodiment includes a step of forming the first line bead 32-1 and the second line bead 32-2 parallel to each other on the target surface 22 under the same predetermined formation conditions such that a first gap 33 having a predetermined gap width WG is formed between the first line bead 32-1 and the second line bead 32-2, and a step of forming the third line bead 32-3 in the first gap 33 under the same formation conditions as those for the first line bead 32-1. The additive manufacturing method according to the first embodiment further includes a step of forming, after forming the third line bead 32-3, the line bead 32 that is formed as an even-numbered line under the same formation conditions as those for the first line bead 32-1 such that it is parallel to the first line bead 32-1 and a second gap 34 having the predetermined gap width WG is formed between the line bead 32 formed as an even-numbered line and the line bead 32 formed two lines before, and a step of forming, after forming the third line bead 32-3, the line bead 32 that is formed as an odd-numbered line in the second gap 34 between the line bead 32 formed immediately before and the line bead 32 formed three lines before under the same formation conditions as those for the first line bead 32-1.

Figure 6:
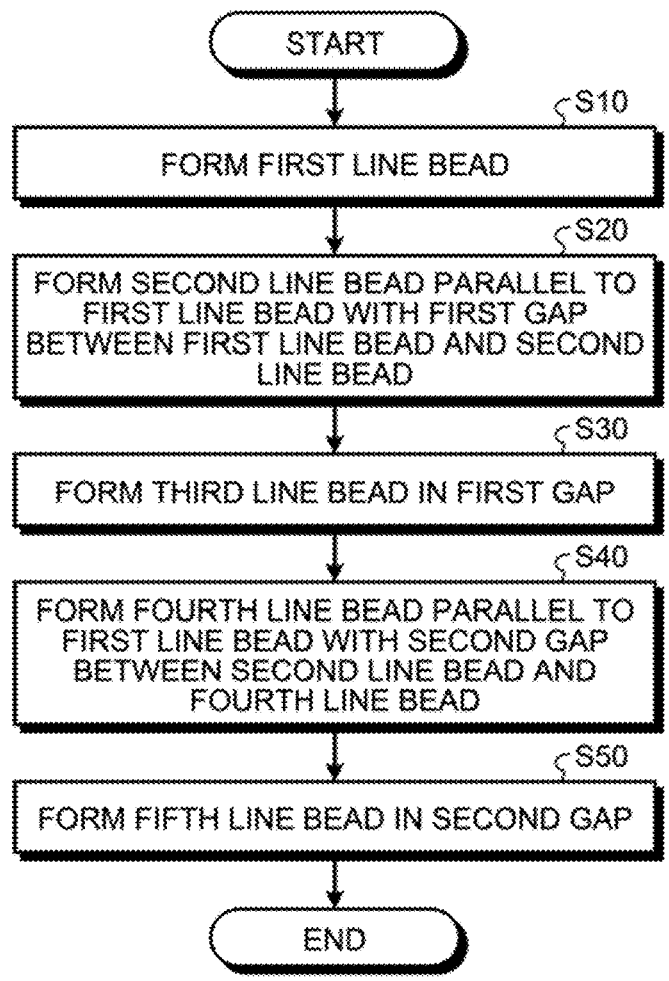
FIG. 6 is a flowchart illustrating a procedure of an additive machining process performed by the additive manufacturing device illustrated in FIG. 1.

FIG. 6 is a flowchart illustrating a procedure of an additive machining process performed by the additive manufacturing device 100 illustrated in FIG. 1. The additive machining described below is performed by the control device 1 controlling the wire supply unit 19, the irradiation unit, and the gas supply unit in accordance with a machining program.

Figure 7:
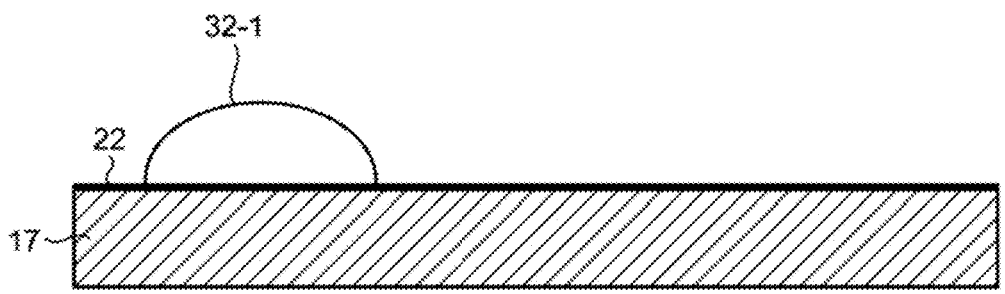
FIG. 7 is a schematic cross-sectional view illustrating a state where a first line bead is formed on the target surface in the additive machining process performed by the additive manufacturing device illustrated in FIG. 1.

First, at Step S10, the first line bead 32-1 is formed at a predetermined position on the target surface 22 as illustrated in FIG. 7.

Figure 8:
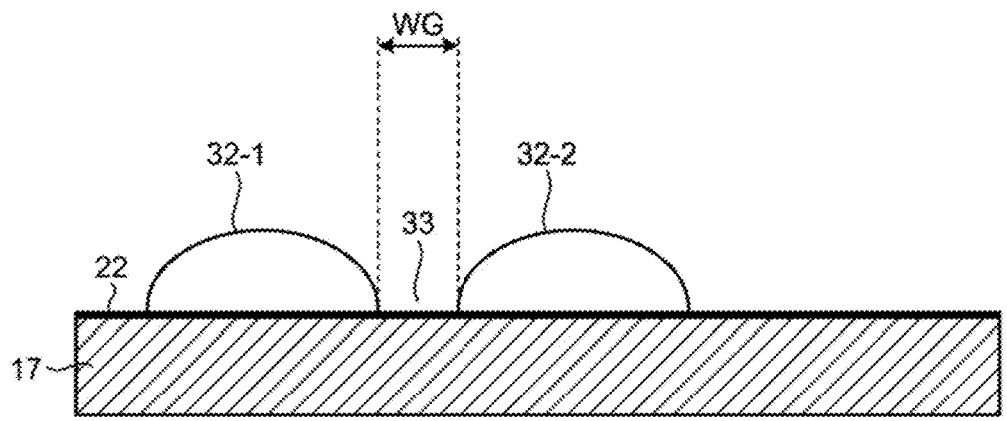
FIG. 8 is a schematic cross-sectional view illustrating a state where a second line bead is formed on the target surface in the additive machining process performed by the additive manufacturing device illustrated in FIG. 1.

Next, at Step S20, the second line bead 32-2 is formed on the target surface 22 such that it is parallel to the first line bead 32-1 as illustrated in FIG. 8. The second line bead 32-2 is formed with the first gap 33 having the predetermined gap width WG between the first line bead 32-1 and the second line bead 32-2.

Figure 9:
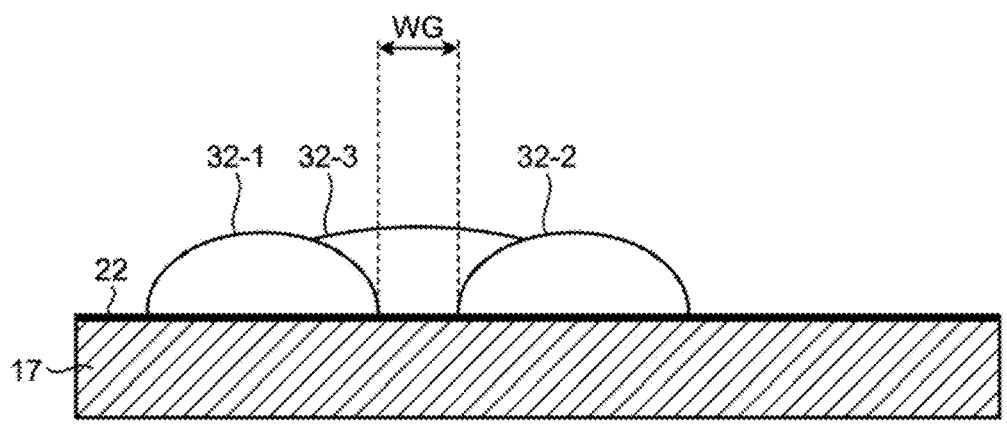
FIG. 9 is a schematic cross-sectional view illustrating a state where a third line bead is formed on the target surface in the additive machining process performed by the additive manufacturing device illustrated in FIG. 1.

Subsequently, at Step S30, the third line bead 32-3 is formed so as to fill the first gap 33 as illustrated in FIG. 9. The third line bead 32-3 is thus formed parallel to the first line bead 32-1 and the second line bead 32-2.

Figure 10:
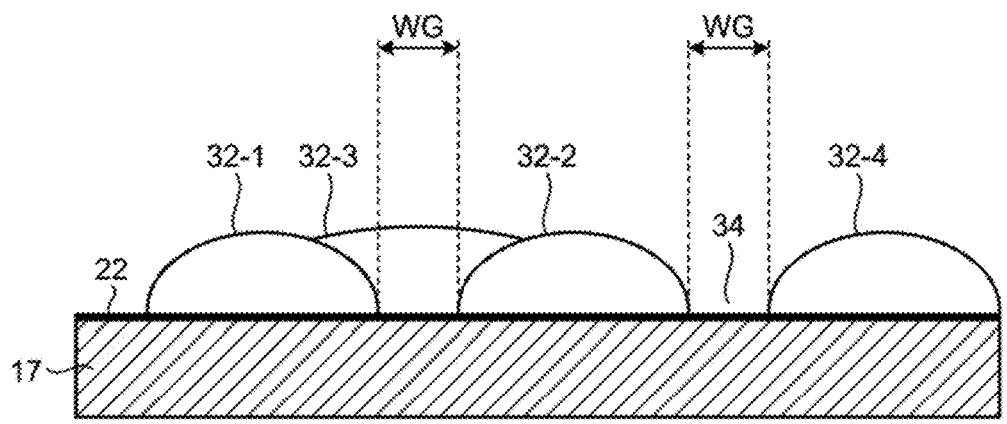
FIG. 10 is a schematic cross-sectional view illustrating a state where a fourth line bead is formed on the target surface in the additive machining process performed by the additive manufacturing device illustrated in FIG. 1.

Next, at Step S40, the fourth line bead 32-4 is formed on the target surface 22 such that it is parallel to the first line bead 32-1 as illustrated in FIG. 10. The fourth line bead 32-4 is formed with the second gap 34 having the predetermined gap width WG described above between the second line bead 32-2 and the fourth line bead 32-4. That is, the fourth line bead 32-4 is formed on the opposite side of the second line bead 32-2 from the third line bead 32-3 within the plane of the target surface 22.

Figure 11:
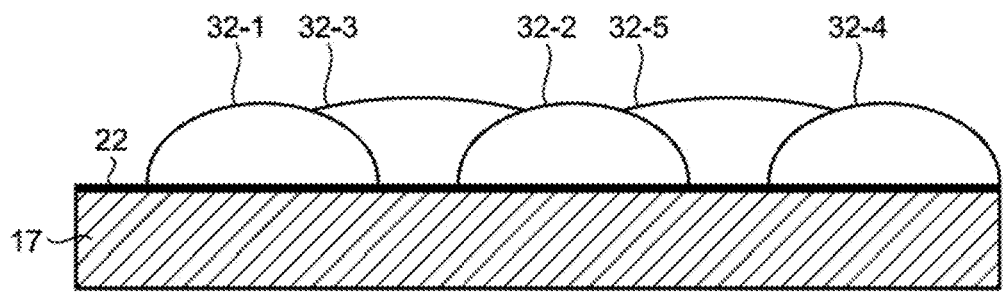
FIG. 11 is a schematic cross-sectional view illustrating a state where a fifth line bead is formed on the target surface in the additive machining process performed by the additive manufacturing device illustrated in FIG. 1.

Subsequently, at Step S50, the fifth line bead 32-5 is formed so as to fill the second gap 34 as illustrated in FIG. 11. The fifth line bead 32-5 is thus formed parallel to the first line bead 32-1 and the second line bead 32-2.

Thereafter, the processes at Steps S40 and S50 described above are repeated as a set of processes to form the line beads 32 including the sixth line bead 32-6 to the eleventh line bead 32-11.

In the additive manufacturing method according to the first embodiment, the above steps are performed to form a single planar bead layer made up of a plurality of line beads 32 joined together. The planar bead layers are laminated one by one by performing the above steps so that a manufactured object of the plural laminated planar bead layers can be formed. The planar bead layer is a set of the line beads 32 formed on a single target surface 22.

The line beads 32 including the first line bead 32-1 to the eleventh line bead 32-11 are formed under the same predetermined manufacturing conditions except for the length. Accordingly, the supply volume of the wire 5 per unit time to be supplied to form each of the line beads 32 including the first line bead 32-1 to the eleventh line bead 32-11 is also uniform.

A single continuous additive machining process is performed in the same direction along the respective longitudinal directions of the line beads 32 to form each of the line beads 32. Each of the line beads 32 is thus formed as a single line bead extending continuously in the longitudinal direction without a joint. This can prevent the occurrence of an uneven section caused by a joint between the longitudinally opposite ends of each of the line beads 32, and thus can form the deposit 31 with a uniform height between the longitudinally opposite ends of the line beads 32.

With the additive manufacturing method according to the first embodiment described above, when a planar bead layer is formed, a first line bead 32 and all the even-numbered line beads 32 are formed with a steady-state shape such that a gap is formed between the line beads 32, instead of arranging the line beads 32 one after another without a gap in the width direction of the line beads 32 from the edge of the bead formation surface, which becomes a surface on which the planar bead layer is formed. All the odd-numbered line beads 32, excluding an initial line bead 32, fill the gaps. The steady-state shape of the line bead 32 refers to a shape of a single line bead 32 when this line bead 32 is formed alone. The steady-state shape is determined by the laser output, the wire supply rate, and other conditions.

A rounded shape attributable to the surface tension upon solidification of the molten wire 5 is formed at the longitudinally opposite end portions of each line bead 32 and at the widthwise opposite end portions of the first line bead 32-1 and the eleventh line bead 32-11.

As illustrated in FIG. 8, the first line bead 32-1 and the second line bead 32-2 are formed apart from each other with the first gap 33 formed between the first and second line beads 32-1 and 32-2. A rounded shape attributable to the surface tension upon solidification of the molten wire 5 is formed at the opposed portions of the first line bead 32-1 and the second line bead 32-2 that face each other.

When the first line bead 32-1 and the second line bead 32-2 are viewed as a whole, a considerable unevenness is formed due to the first gap 33 and the rounded shape at the opposed portions of the first line bead 32-1 and the second line bead 32-2. However, this considerable unevenness is reduced significantly and made smaller by forming the third line bead 32-3, which is a line bead 32 to be formed as a third line, in such a manner as to fill the first gap 33 as illustrated in FIG. 9.

In the same manner as described above, the second line bead 32-2 and the fourth line bead 32-4 are formed apart from each other with the second gap 34 formed between the second and fourth line beads 32-2 and 32-4 as illustrated in FIG. 10. A rounded shape attributable to the surface tension upon solidification of the molten wire 5 is formed at the opposed portions of the second line bead 32-2 and the fourth line bead 32-4 that face each other.

When the second line bead 32-2 and the fourth line bead 32-4 are viewed as a whole, a considerable unevenness is formed due to the second gap 34 and the rounded shape at the opposed portions of the second line bead 32-2 and the fourth line bead 32-4. However, this considerable unevenness is reduced significantly and made smaller by forming the fifth line bead 32-5, which is a line bead 32 to be formed as a fifth line, in such a manner as to fill the second gap 34 as illustrated in FIG. 11.

When the first line bead 32 and all the even-numbered line beads 32 are formed, the gap width WG provided to form any odd-numbered line bead 32 after formation of a third line bead 32 is uniform throughout formation of a single planar bead layer. The value of the gap width WG is set so as to minimize the difference in height between the line beads 32 adjacent to each other when the line beads 32 are arranged.

Flatness of the upper surface of a planar bead layer is considered using the entire flatness of the upper surfaces of the first line bead 32-1 and the third line bead 32-3 after the third line bead 32-3 has been formed so as to fill the first gap 33 as an example. In order to improve the entire flatness of the upper surfaces of the first line bead 32-1 and the third line bead 32-3 after the third line bead 32-3 has been formed so as to fill the first gap 33, that is, in order to minimize the entire unevenness on the upper surfaces of the first line bead 32-1 and the third line bead 32-3, it is preferable that the relation between a pitch width P and a bead width WB is made closer to "pitch width P×2=bead width WB", where the pitch width P is the width between adjacent line beads 32 and the bead width WB is the width of the first line bead 32 and the width of all the even-numbered line beads 32. Where the relation "pitch width P×2=bead width WB" is satisfied, the upper surfaces of the first line bead 32-1 and the third line bead 32-3 become flat and the upper surface of the other region of the planar bead layer also becomes flat.

In order to minimize the entire unevenness on the upper surfaces of the first line bead 32-1 and the third line bead 32-3, it is preferable to define "pitch width P×2/bead width WB" as an overlap ratio and to hold information on the overlap ratio as an adjustment parameter for each build material in advance. The width of the third line bead 32-3 formed in the first gap 33 becomes smaller than the width obtained when the relation "pitch width×2=bead width" is satisfied depending on the material type of the line beads 32, surface tension, and other conditions. That is, the pitch width varies depending on the conditions such as the material type of the line beads 32.

Thus, an advanced test is conducted on the bead width WB on a material basis and the test results are held. The width of the first gap 33 is adjusted on the basis of the bead width WB to improve the overlap ratio. In a case where the overlap ratio is low, the width of the first gap 33 is reduced in order to supply a greater amount of build material to the edges of the third line bead 32-3, so that the unevenness between the first line bead 32-1 and the third line bead 32-3 becomes smaller. The overlap ratio is held as one of the process parameters. The manufacturing accuracy can be improved by adjusting the width of the first gap 33 while taking into account the overlap ratio.

It is also allowable to hold and use a more appropriate value of the bead width WB as one of the process parameters in accordance with the laser output, the bead formation rate, and other conditions.

The process parameters are manufacturing conditions that are set for the additive manufacturing device 100 to form the line beads 32. Examples of the process parameters include a laser-beam output, a laser-beam irradiation angle, a laser-beam focus diameter, a material supply rate, a material supply angle, a gap distance between a wire nozzle and a manufactured object, a shield-gas supply amount, a shield-gas supply angle, and a shield-gas nozzle diameter.

In a case where, for example, a three-dimensional object with a cuboid or square-pyramid shape is formed by additive machining using the DED method, a longer additive-machining time is required. An object is manufactured by stacking planar bead layers to an intended height and thus forming a laminated body of the planar bead layers. In this case, even if there is a very slight difference in height between line beads that make up a single planar bead layer, in the laminated body of a plurality of laminated planar bead layers, such a slight difference in height between line beads of the single planar bead layer is accumulated by the number of planar bead layers laminated. Thus, on the topmost planar bead layer of the manufactured object that is a final laminated body, there is a greater difference in height between line beads, resulting in degradation in flatness of the upper surface of the manufactured object.

As the difference in height is greater, problems are more likely to occur such that, due to variations in height of the shape of the immediately-lower planar bead layer, planar bead layers are laminated not vertically but in an inclined manner because a line bead to be formed flows into a recess between line beads of the immediately-lower planar bead layer or flows to the outside at the opposite edges of the planar bead layer.

In contrast, in the additive manufacturing method according to the first embodiment, a planar bead layer is formed in the described sequence. This can reduce the difference in height between adjacent line beads 32 and can also reduce the difference in height between the line beads 32 that make up a single planar bead layer. Consequently, it becomes possible to reduce the difference in height between the line beads 32 on the topmost planar bead layer of a manufactured object that is a final laminated body, so that the flatness of the upper surface of the manufactured object can be improved.

In the additive manufacturing method according to the first embodiment, the line beads 32 adjacent to each other are not formed consecutively. Thus, all the even-numbered line beads 32 to be formed are less likely to be affected by the shape and the remaining heat of the line bead 32 formed immediately before. All the line beads 32 having been formed require almost equal time for cooling. This can also reduce the influence of external factors of temperature on formation of the line beads 32. Thus, in the additive manufacturing method according to the first embodiment, heat input to the base layer on which the line beads 32 are formed advances under nearly the same conditions between these line beads 32, and heat radiation from the line beads 32 having been formed advances under nearly the same conditions between these line beads 32. This can also reduce the influence of external factors of temperature on formation of the line beads 32.

In the additive machining using the DED method, a method for forming a planar bead layer while removing the influence of external factors of temperature requires provision of a natural cooling time each time a single line bead 32 is formed until the temperature of this line bead 32 returns to approximately the ordinary temperature. However, in this case, after each formation of a single line bead 32, a standby time is required before a start of forming the next line bead 32. This increases the machining time.

In contrast, after formation of a single line bead 32, the additive manufacturing device 100 according to the first embodiment does not require a standby time before a start of forming the next line bead 32. The time required for additive machining is not increased.

As described above, the additive manufacturing method according to the first embodiment has an effect where it is possible to improve the shape accuracy of a manufactured object.

Second Embodiment

In a second embodiment, descriptions are given of a machining-path generation method for generating a machining path intended to execute control on the additive manufacturing device 100 in accordance with the additive manufacturing method explained in the first embodiment described above.

Figure 12:
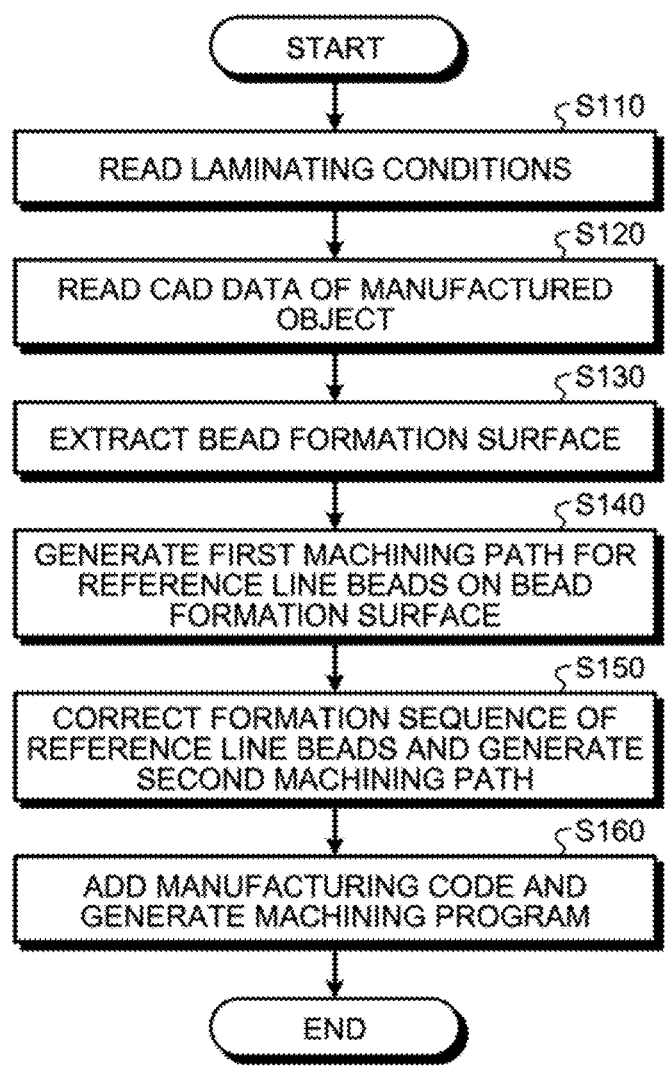
FIG. 12 is a flowchart illustrating a procedure of a machining-program generation process in the CAM device illustrated in FIG. 2.

FIG. 12 is a flowchart illustrating a procedure of a machining-program generation process in the CAM device 110 illustrated in FIG. 2. In the machining-program generation process, a machining program is generated that is intended to implement the additive manufacturing method explained in the first embodiment described above.

First, at Step S110, laminating-condition data 130, including the reference-line-bead formation information and having been input by a user, is received by the data input unit 111 and stored in the data storage unit 112. The machining-path generation unit 113 reads and obtains the reference-line-bead formation information stored in the data storage unit 112, and then stores the obtained information in a storage unit (not illustrated) inside the machining-path generation unit 113. At this step, shape information on a single reference line bead is assumed to be input by a user.

Next, at Step S120, the machining-path generation unit 113 reads and obtains the CAD data 120 stored in the data storage unit 112, and then stores the obtained CAD data 120 in the storage unit (not illustrated) inside the machining-path generation unit 113.

Subsequently, at Step S130, the machining-path generation unit 113 extracts a bead formation surface on the basis of a manufacturing-target shape represented by the CAD data 120. On the basis of information on the height of the manufacturing-target shape represented by the CAD data 120 and information on the height of the reference line bead included in the reference-line-bead formation information, the machining-path generation unit 113 divides the manufacturing-target shape into a plurality of divided layers parallel to each other, and generates a divided-layer shape that represents a shape of each of the divided layers. That is, the machining-path generation unit 113 divides the manufacturing-target shape into a plurality of divided layers parallel to each other and having a height of the reference line bead, and generates divided-layer shape data that represents a shape of the divided layer. The height of the reference line bead corresponds to the height of each of the divided layers.

The machining-path generation unit 113 extracts a bead formation surface from each divided-layer shape. The bead formation surface is a surface of each divided layer on which the reference line beads are formed and thus a planar bead layer is formed. That is, the bead formation surface is the undersurface of the divided-layer shape.

Figure 13:
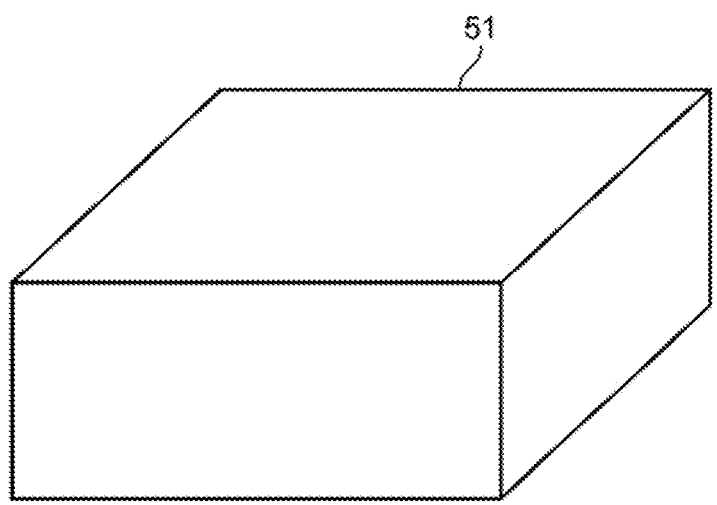
FIG. 13 is a schematic diagram illustrating an example of a manufacturing-target shape that is represented by CAD data and is to be processed by a machining-path generation unit illustrated in FIG. 2.
Figure 14:
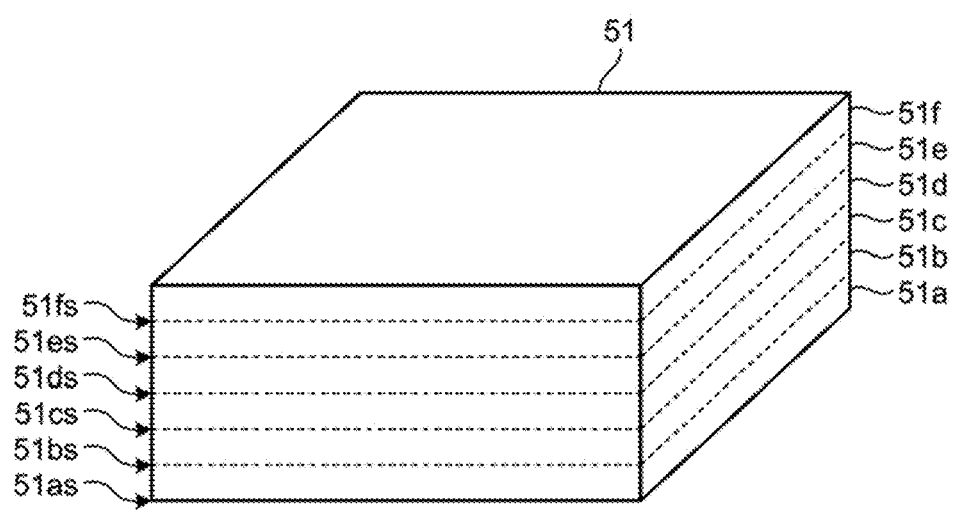
FIG. 14 is a schematic diagram illustrating an example of divided layers that are obtained after division by the machining-path generation unit illustrated in FIG. 2.

An example of extraction of the bead formation surface is described below. FIG. 13 is a schematic diagram illustrating an example of a manufacturing-target shape that is represented by the CAD data 120 and is to be processed by the machining-path generation unit 113 illustrated in FIG. 2. FIG. 14 is a schematic diagram illustrating an example of divided layers that are obtained after division by the machining-path generation unit 113 illustrated in FIG. 2. For example, in a case where the manufacturing-target shape is as illustrated in FIG. 13, the machining-path generation unit 113 divides a manufacturing-target shape 51 into a plurality of divided layers parallel to each other and having a height of the reference line bead, that is, divided layers 51a, 51b, 51c, 51d, 51e, and 51f.

The machining-path generation unit 113 extracts bead formation surfaces 51as, 51bs, 51cs, 51ds, 51es, and 51fs individually from the respective divided-layer shapes of the divided layers 51a, 51b, 51c, 51d, 51e, and 51f.

Next, at Step S140, the machining-path generation unit 113 generates a machining path for the reference-line-bead additive machining to individually form each of the divided layers obtained at Step S130. The machining-path generation unit 113 then collects the machining paths for the divided layers together to generate a first machining path for the reference line-bead additive machining to form the manufacturing-target shape. The machining path is a reference-line-bead formation path when the divided-layer shape of each divided layer is formed by arranging a plurality of reference line beads one after another in parallel from the edge of the bead formation surface along the width direction of the reference line beads. The machining path is a path along which line-bead additive machining is performed and is a tool path of the machining head 10. Thus, the first machining path is a set of reference-line-bead formation paths for the respective divided layers and is a set of machining paths for the respective divided layers.

Next, at Step S150, the machining-path generation unit 113 generates a second machining path by correcting the formation sequence of a plurality of reference line beads in the first machining path obtained at Step S140 in accordance with the additive manufacturing method explained in the first embodiment described above. The second machining path is a reference-line-bead machining path to form the manufacturing-target shape when a plurality of reference line beads are arranged in parallel in the machining sequence in accordance with the additive manufacturing method explained in the first embodiment described above. The machining-path generation unit 113 then transmits data of the generated second machining path to the machining-program conversion unit 114.

Subsequently, at Step S160, the machining-program conversion unit 114 converts the data of the second machining path generated at Step S150 into a machining program, and adds a manufacturing code to the machining program. Due to this operation, the machining program is generated that specifies the path on which the machining head 10 is actuated in manufacturing an object. The manufacturing code includes information on a command instructing the additive manufacturing device 100 to operate the beam nozzle 11, the wire nozzle 12, and the gas nozzle 13 in the procedure of manufacturing each divided layer.

It is allowable that after having read the CAD data 120, the machining-path generation unit 113 automatically selects the reference-line-bead formation information to be used for the above processes by the machining-path generation unit 113. In this case, the reference-line-bead formation information regarding a plurality of different types of reference line beads is stored in a process map format in advance in the data storage unit 112 or the machining-path generation unit 113. The process map stores the manufacturing conditions set for the additive manufacturing device 100 in association with the shape information such as a width and a height of line beads formed under these manufacturing conditions. That is, the process map is information indicating the relevancy between manufacturing conditions of a line bead set for the additive manufacturing device 100 and shape information on a line bead corresponding to these manufacturing conditions.

On the basis of information including the additive machining conditions in the additive manufacturing device 100 and the manufacturing-target shape represented by the CAD data 120, the machining-path generation unit 113 selects an appropriate reference line bead from among the plural types of reference line beads, and uses the reference-line-bead formation information on the selected reference line bead. The machining-path generation unit 113 can obtain various conditions input to the CAM device 110, such as the laser output and the wire supply rate of the additive manufacturing device 100 as well as the dimensions of the thinnest portion of the manufacturing-target shape represented by the CAD data 120. On the basis of these obtained conditions, the machining-path generation unit 113 can select an appropriate reference line bead.

FIG. 15 is a diagram illustrating an example of a process map 61 referenced by the machining-path generation unit 113 illustrated in FIG. 2. For example, the process map 61 includes, on a management-number basis, mechanical parameters of the additive machining conditions and bead data that is the reference-line-bead formation information on the reference line bead as process parameters set for the additive manufacturing device 100. The mechanical parameters include information indicating the beam diameter of the laser beam 24, the shaft feed rate that is the feed rate of the machining head 10, the wire supply volume rate that is the rate at which the wire 5 is supplied, the laser output that is the output of the laser beam 24, and the wire angle that is an angle formed by the central axis of the wire 5 relative to the central axis of the laser beam 24. The bead data includes information indicating the bead width that is the width of the reference line bead, the bead height that is the height of the reference line bead, and the bead tendency showing a melting tendency of the reference line bead.

In the process map 61 illustrated in FIG. 15, the bead tendency is shown as "stub S" in a case when the wire 5 exhibits a low tendency to melt when the tip end of the wire 5 is at a specific process position, is shown as "OK" in a case when the wire 5 tends to properly melt when the tip end of the wire 5 is at a specific process position, and is shown as "drop D" in a case when the wire 5 tends to easily melt when the tip end of the wire 5 is at a specific process position. When the bead tendency shows "drop", molten metal of the wire 5 melted by overheating is brought into a droplet state. This molten metal in a droplet state is liquid and thus expands easily upon falling in drops on the surface. Accordingly, the height and the width of the line bead 32 differ from those under the optimal conditions. "Drop" occurs in the cases such as when the wire supply amount is insufficient with respect to the laser output and when the laminating location is excessively apart from the wire supply location.

As described above, in the machining-path generation method according to the second embodiment, the CAM device 110 automatically determines and generates a machining path for the additive manufacturing device 100 to form a manufactured object in accordance with the additive manufacturing method described in the first embodiment. Due to this operation, the CAM device 110 can automatically generate a machining path by which it is possible to improve the shape accuracy of the manufactured object without imposing a burden on a user because the user does not need to be aware of the formation sequence of the line beads 32 at the time of forming a planar bead layer.

Third Embodiment

In the additive manufacturing method according to the first embodiment described above, an odd number of reference line beads are formed. In the machining-path generation method according to the second embodiment, it is thus assumed that each divided layer is made up of an odd number of reference line beads. In a third embodiment, descriptions are given of a process when there are an even number of machining paths on each of the divided layers, where the machining paths on the divided layers make up the first machining path generated at Step S140.

Figure 16:
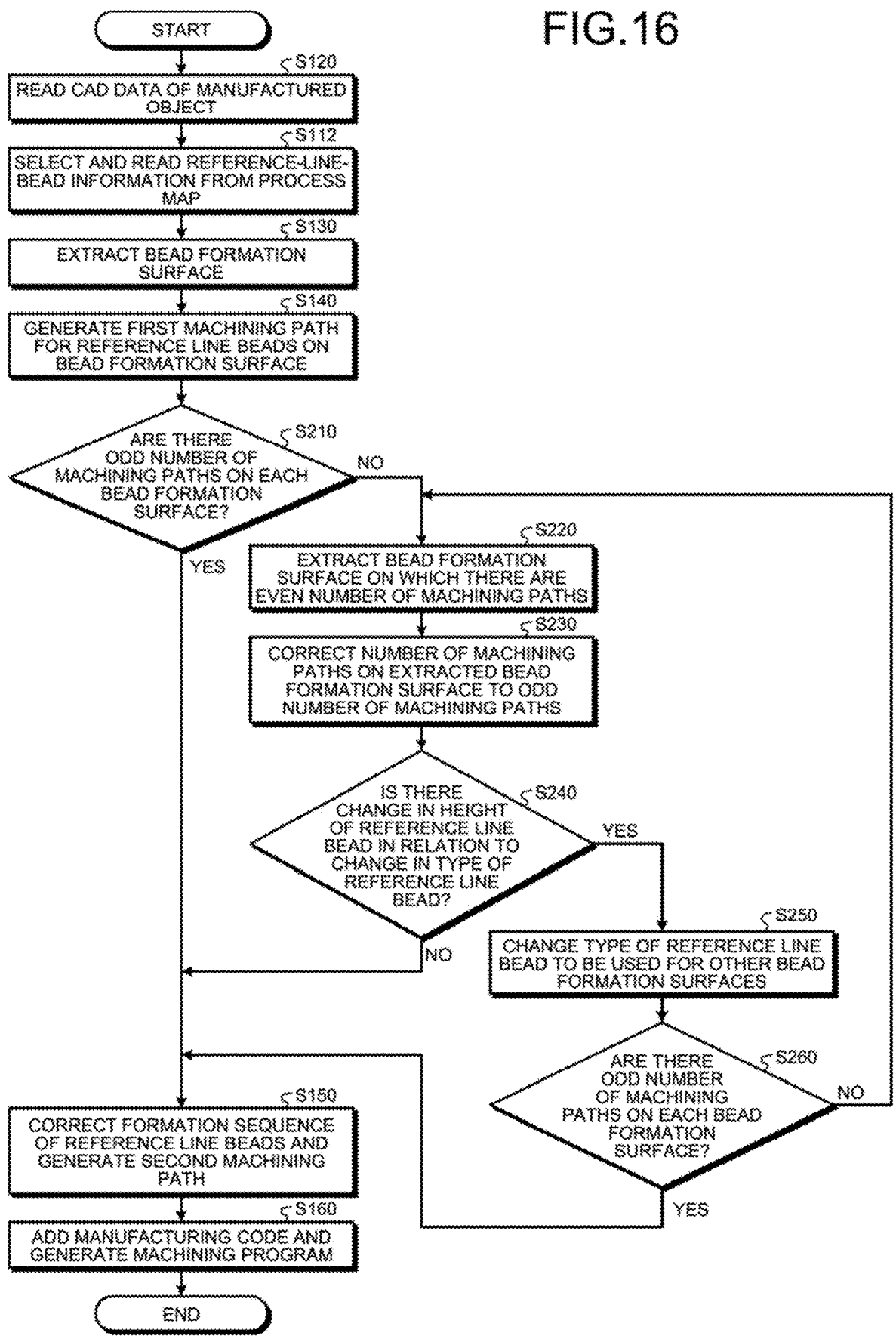
FIG. 16 is a flowchart illustrating a procedure of a machining-program generation process according to a third embodiment in the CAM device illustrated in FIG. 2.

FIG. 16 is a flowchart illustrating a procedure of a machining-program generation process according to the third embodiment in the CAM device 110 illustrated in FIG. 2.

First, Step S120 described above is performed, and then Step S112 is performed.

At Step S112, on the basis of the CAD data 120, the machining-path generation unit 113 selects a reference line bead to be used to generate a first machining path under the constraint of the minimum width of a line bead attributable to the type of metal material to be used for manufacturing and under the constraint to a manufactured object that there is a location that needs a thin line bead because the manufactured object has a hollow shape. The machining-path generation unit 113 cites the reference-line-bead formation information on the selected reference line bead from the process map 61.

Next, Steps S130 and S140 described above are performed.

Subsequently, at Step S210, the machining-path generation unit 113 determines whether there are an odd number of machining paths for reference-line-bead additive machining on each bead formation surface. When there are an odd number of reference-line-bead machining paths on each bead formation surface, the determination is YES at Step S210. The process flow advances to Step S150. When there are an even number of reference-line-bead machining paths on each bead formation surface, the determination is NO at Step S210. The process flow advances to Step S220.

At Step S220, the machining-path generation unit 113 extracts the bead formation surface on which there are an even number of machining paths.

Next, at Step S230, the machining-path generation unit 113 changes the number of machining paths on the extracted bead formation surface to an odd number to regenerate machining paths and thus regenerate a first machining path. That is, the machining-path generation unit 113 selects, from the process map 61, another type of reference line bead having a different width, i.e., different reference-line-bead formation information, from that of the reference line bead used at Step S140, and thereby changes the type of reference line bead to be used to the selected reference line bead. The machining-path generation unit 113 then uses the selected reference line bead to regenerate machining paths on the extracted bead formation surface such that the number of machining paths is an odd number, and regenerate a first machining path in the same manner as at Step S140.

The machining-path generation unit 113 changes the type of reference line bead by deriving, from the process map 61, the width and the height of a reference line bead that allows the overall width of the reference line beads when the number of the reference line beads is an odd number to match the entire width of the manufactured shape of laminated planar bead layers and also by deriving, from the process map 61, the process parameters corresponding to the reference line bead having the derived height and width. This prevents a manufactured portion, formed by the additive manufacturing device 100 in accordance with the second machining path generated after the type of reference line bead is changed, from having a different width from the finished shape of the manufactured object represented by the CAD data 120.

Next, at Step S240, the machining-path generation unit 113 determines whether there is a change in height of the reference line bead in relation to the change in type of the reference line bead to be used. When there is no change in height of the reference line bead in relation to the change in type of the reference line bead to be used, the determination is NO at Step S240. The process flow advances to Step S150. When there is a change in height of the reference line bead in relation to the change in type of reference line bead to be used, the determination is YES at Step S240. The process flow advances to Step S250.

At Step S250, the machining-path generation unit 113 changes the type of reference line bead to be used for at least some of the divided layers other than the divided layer in which the height of the reference line bead has been changed. That is, the machining-path generation unit 113 selects, from the process map 61, another type of reference line bead with different reference-line-bead formation information from that on the reference line bead used at Step S140 as a reference line bead to be used for at least some of the divided layers other than the divided layer in which the height of the reference line bead has been changed.

When there is a change in height of the reference line bead to be used for the extracted machining formation surface, a manufactured object formed by additive machining in accordance with the first machining path has a height different from the height of the manufacturing-target shape represented by the CAD data 120. The machining-path generation unit 113 thus performs a process of changing the height of at least some of the divided layers other than the divided layer in which the height of the reference line bead has been changed, such that the height of the manufactured object formed by additive machining in accordance with the first machining path is made equal to the height of the manufacturing-target shape represented by the CAD data 120.

The machining-path generation unit 113 then uses the changed type of reference line bead to regenerate machining paths on at least some of the divided layers other than the divided layer in which the height of the reference line bead has been changed in the same manner as at Step S140.

Subsequently, at Step S260, the machining-path generation unit 113 determines whether there are an odd number of reference-line-bead machining paths on each bead formation surface on which the machining paths have been regenerated. When there are an odd number of reference-line-bead machining paths on each bead formation surface, the determination is YES at Step S260. The process flow advances to Step S150. When there are an even number of reference-line-bead machining paths on each bead formation surface, the determination is NO at Step S260. The process flow returns to Step S220.

In a case where a planar bead layer is formed by the additive manufacturing method according to the first embodiment as described above, an odd number of reference line beads are formed on each bead formation surface. Meanwhile, the width of the reference line bead varies depending on the process parameters set for the additive manufacturing device 100. For this reason, when the additive manufacturing method according to the first embodiment is used, there may arise a need to take into account which reference line bead associated with which process parameters needs to be selected in order to form an odd number of reference line beads on each bead formation surface extracted from the CAD data 120 by the CAM device 110 corresponding to the width of each bead formation surface.

As described above, even when the number of machining paths that make up the first machining path in the machining-path generation method according to the second embodiment is an even number, in the machining-path generation method according to the third embodiment, it is still possible to form a second machining path by automatically correcting the first machining path such that the number of machining paths that make up the first machining path is an odd number. Therefore, in the machining-path generation method according to the third embodiment, even in a case of generating a machining program to additively machine a three-dimensional object having a complex shape, a machining program capable of improving the shape accuracy of the manufactured object can be automatically generated without imposing a burden on a user.

Fourth Embodiment

In a fourth embodiment, descriptions are given of a process of determining a machining path including a redundant shape to a manufacturing-target shape represented by the CAD data 120 and generating a machining program. In the machining-program generation process according to the fourth embodiment, the CAM device 110 reads the CAD data 120 and thereafter generates a second machining path on the basis of the third embodiment described above. In a case where the CAM device 110 cannot generate a second machining path that corresponds to the manufacturing-target shape represented by the CAD data 120 even by using a reference line of any reference line bead included in the process map 61, the CAM device 110 adds a redundant shape to the manufacturing-target shape to generate a second machining path.

Figure 17:
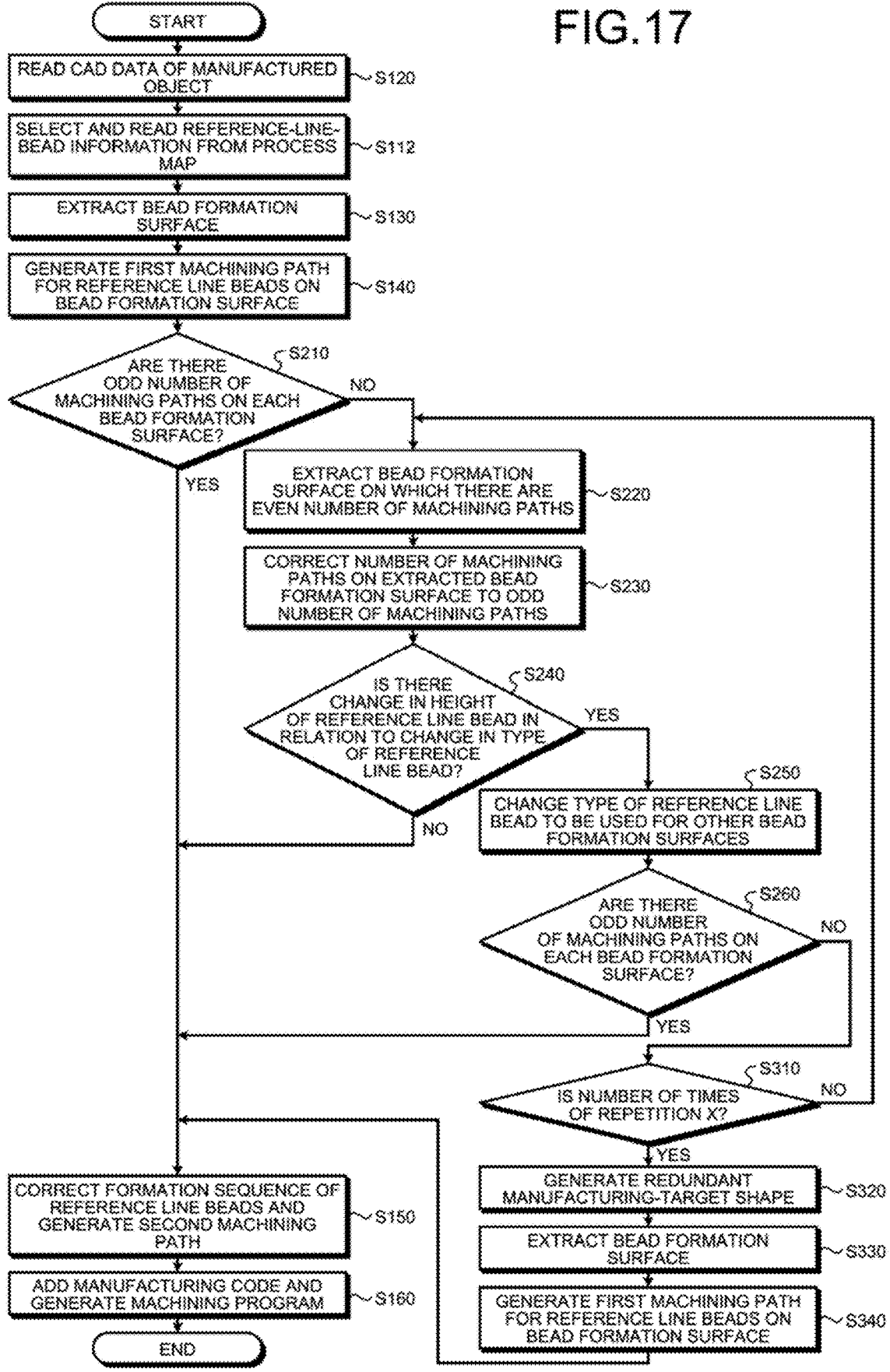
FIG. 17 is a flowchart illustrating a procedure of a machining-program generation process according to a fourth embodiment in the CAM device illustrated in FIG. 2.

FIG. 17 is a flowchart illustrating a procedure of a machining-program generation process according to the fourth embodiment in the CAM device 110 illustrated in FIG. 2. Descriptions of the processes identical to those in the third embodiment are omitted.

When the determination is NO at Step S260, the process flow advances to Step S310. At Step S310, the machining-path generation unit 113 determines whether the number of repetitions of Steps S220 to S260 is X that is a predetermined threshold number of times. The threshold number of times is a threshold of the number of repetitions of Steps S220 to S260 and is used for the machining-path generation unit 113 to determine whether to shift to a redundant-shape examination flow. The threshold number of times is stored in the machining-path generation unit 113 in advance. It is also possible that the threshold number of times is input to the CAM device 110 by a user as appropriate.

When the number of repetitions is not X that is a predetermined threshold number of times, the determination is NO at Step S310. The process flow returns to Step S220. When the number of repetitions is X that is a predetermined threshold number of times, the determination is YES at Step S310. The process flow advances to Step S320.

At Step S320, the machining-path generation unit 113 adds a redundant shape to the manufacturing-target shape to generate a corrected redundant manufacturing-target shape. The redundant shape refers to an excess portion that is formed beyond the manufacturing-target shape and is to be removed after the manufacturing. In adding the redundant shape, the machining-path generation unit 113 sets a proper additive shape so as to obtain a proper grinding amount of the redundant shape to the redundant manufacturing-target shape after the manufacturing.

In this case, where the grinding amount is used as an evaluation function and the process parameters are defined as a variable, then the proper additive shape refers to a redundant shape whose evaluation-function value is smaller than a predetermined threshold. In this case, the additive shape that minimizes the value of the evaluation function is most preferable. For example, where the grinding amount of the redundant shape to the redundant manufacturing-target shape after the manufacturing is used as an evaluation function, the value of the evaluation function is expressed as "volume of redundant manufacturing-target shape−volume of manufacturing-target shape".

The machining-path generation unit 113 has a function to serve as a redundant manufacturing-target shape generation unit that generates a redundant manufacturing-target shape obtained by adding, to the manufacturing-target shape, a proper additive shape whose evaluation-function value is smaller than a predetermined threshold, where the grinding amount is used as the evaluation function. Under the condition that the additive manufacturing method explained in the first embodiment described above is applied to form an odd number of reference line beads on each bead formation surface, the machining-path generation unit 113 references the process map 61 and determines the redundant manufacturing-target shape by using the number of reference line beads and the manufacturing conditions as a variable. That is, where the difference in volume between the redundant manufacturing-target shape and the manufacturing-target shape is used as an evaluation function and where the number of reference line beads and the manufacturing conditions of reference line beads are defined as a variable, then the redundant manufacturing-target shape is set such that the volume of the redundant shape is smaller than a predetermined threshold. The redundant manufacturing-target shape generation unit may be provided separately from the machining-path generation unit 113.

Subsequently, at Step S330, the machining-path generation unit 113 extracts a bead formation surface on the basis of the redundant manufacturing-target shape in the same manner as at Step S130.

Next, at Step S340, the machining-path generation unit 113 generates machining paths on each of the divided layers obtained at Step S330, and collects the machining paths together to generate a first machining path in the same manner as at Step S140. Thereafter, the machining-path generation unit 113 advances to Step S150.

When the additive manufacturing method described in the first embodiment is applied, a proper second machining path in accordance with the manufacturing-target shape may not be generated in some cases. In those cases, the processes described above are performed and thereby a machining program can be automatically generated in which the grinding amount of the redundant shape to the redundant manufacturing-target shape after the manufacturing is properly set.

Figure 18:
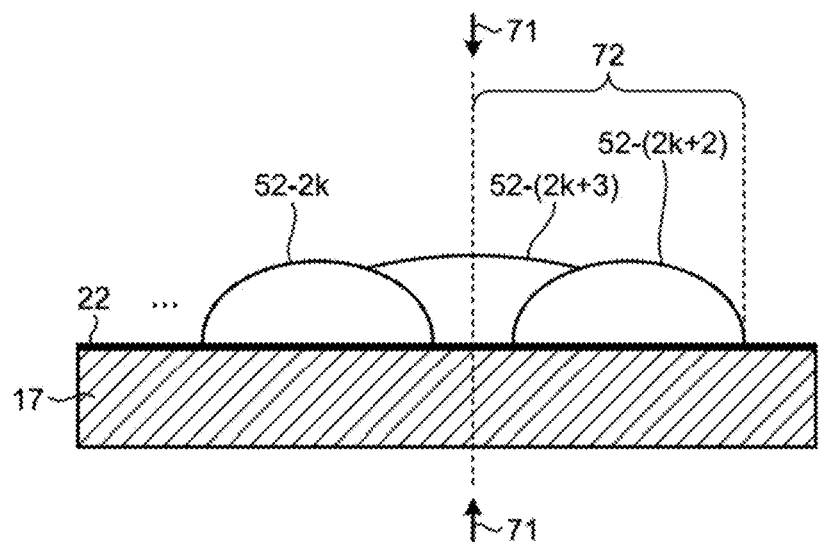
FIG. 18 is a schematic cross-sectional view illustrating an example of reference line beads formed to correspond to a redundant manufacturing-target shape formed in accordance with a second machining path generated by the CAM device illustrated in FIG. 2.

FIG. 18 is a schematic cross-sectional view illustrating an example of reference line beads formed to correspond to the redundant manufacturing-target shape formed in accordance with the second machining path generated by the CAM device 110 illustrated in FIG. 2. Arrows 71 in FIG. 18 indicate the edge position of the manufacturing-target shape. As illustrated in FIG. 18, a reference line bead 52-2$k$, a reference line bead 52-(2$k$+3), and a reference line bead 52-(2$k$+2) are formed close to the edge position of the manufacturing-target shape, thereby forming a planar bead layer. The value k is an integer equal to or greater than 1. In FIG. 18, the right-side portion with respect to the arrows 71 is a redundant portion 72 corresponding to the redundant shape.

In a case where the additive manufacturing method according to the first embodiment is applied to generate a machining program, there may arise a situation where all the bead widths held as the process parameters in the CAM device 110 are too large or too small depending on the manufacturing-target shape. In order to address this situation, the entire manufacturing-target shape is generated by means of near net shape manufacturing that is intended to manufacture an object with a shape slightly larger than a desired manufacturing-target shape, and then the redundant shape is removed. However, as the volume of the redundant portion becomes greater, the amount of work during finishing by means of grinding or polishing after the manufacturing is increased. The material cost for forming the redundant-shape portion is a wasted cost.

As described above, in the machining-path generation method according to the fourth embodiment, on the basis of the manufacturing-target shape represented by the input CAD data 120 and on the basis of the value of the evaluation function and the process parameters, a proper additive shape is added to the manufacturing-target shape as needed. This produces an effect of suppressing an excessive increase in volume of the redundant-shape portion. The amount of removal in the finishing after the manufacturing is reduced and thus the total material amount used for additive manufacturing can be reduced.

When it is apparent that the volume of a redundant-shape portion is very small relative to the manufacturing-target shape, it is also possible to employ a procedure in which the machining-path generation unit 113 shifts directly to Step S320 without performing a loop process from Step S310 back to Step S220 so as to generate a redundant manufacturing-target shape.

The embodiments described above are applicable to both generation of a machining program for the additive manufacturing device 100 to perform additive machining using wire as a build material and generation of a machining program for the additive manufacturing device 100 to perform additive machining using powder as a build material.

The configurations described in the above embodiments are only examples of an aspect of the present invention. The configurations can be combined with other well-known techniques and part of the configurations can be omitted or modified without departing from the scope of the present invention.

REFERENCE SIGNS LIST 1 control device, 2 laser oscillator, 3 fiber cable, 4 rotational motor, 5 wire, 6 wire spool, 7 gas supply device, 8 pipe, 10 machining head, 11 beam nozzle, wire nozzle, 13 gas nozzle, 14 head drive device, 15 stage, 16 rotational mechanism, 17 base material, 18 deposit, 19 wire supply unit, 22 target surface, 24 laser beam, 25 shield gas, 31 deposit, 31$a$ manufacturing-target shape, 32 line bead, 33 first gap, second gap, 41 CPU, 42 RAM, 43 ROM, 44 external storage device, 45 input/output interface, 46 bus, 51 manufacturing-target shape, 51$a$, 51$b$, 51$c$, 51$d$, 51$e$, 51$f$ divided layer, 51$as$, 51$bs$, 51$cs$, 51$ds$, 51$es$, 51$fs$ bead formation surface, 61 process map, 71 arrow, 72 redundant portion, 100 additive manufacturing device, 110 CAM device, 111 data input unit, 112 data storage unit, 113 machining-path generation unit, 114 machining-program conversion unit, 120 CAD data, 130 laminating-condition data, 200 additive manufacturing system, P pitch width, WB bead width, WG gap width.

The invention claimed is:
1. A machining-path generation method for generating a machining path to manufacture a three-dimensional object by laminating a linear bead on a target surface, the method comprising:

obtaining manufacturing-shape data that represents a manufacturing-target shape of an object;

obtaining reference-line-bead formation information that is information on a shape of the linear bead to be formed;

dividing the manufacturing-target shape into a plurality of divided layers parallel to each other and having a height of the linear bead, on a basis of the manufacturing-shape data and the reference-line-bead formation information, and extracting a plurality of bead formation surfaces that are undersurfaces of the divided layers; and generating a machining path to form an odd number of the linear beads on each of the bead formation surfaces from an edge of the bead formation surface and to laminate the linear beads until the manufacturing-target shape is formed, wherein the generating the machining path includes generating the machining path for a case when the odd number of the linear beads are formed on each of the bead formation surfaces in accordance with an additive manufacturing method comprising:

forming a first linear bead and a second linear bead parallel to each other under a same predetermined formation condition such that a gap having a predetermined width is formed on the target surface between the first linear bead and the second linear bead;

forming a third linear bead in the gap under the same formation condition;

forming, after forming the third linear bead, the linear bead that is formed as an even-numbered line under the formation condition such that the linear bead is parallel to the first linear bead and a gap having a predetermined width is formed on the target surface between the linear bead formed as an even-numbered line and a linear bead formed two lines before; and forming, after forming the third linear bead, the linear bead that is formed as an odd-numbered line in the gap formed on the target surface between the linear bead formed immediately before and the linear bead formed three lines before under the formation condition.

2. The machining-path generation method according to claim 1, wherein the generating the machining path includes deriving, from a process map, a manufacturing condition of the linear bead and information on a width and a height of the linear bead that allow an overall width of the odd number of the linear beads on each of the divided layers to match a width of a corresponding one of the divided layers, the process map indicating a relevancy between a manufacturing condition of the linear bead and shape information on a linear bead corresponding to the manufacturing condition.

3. The machining-path generation method according to claim 1, wherein when an overall width of the odd number of the linear beads is not capable of matching a width of the divided layer, the generating the machining path includes a generating a redundant manufacturing-target shape obtained by adding a redundant shape to a volume of the manufacturing-target shape and extracting the bead formation surfaces from the redundant manufacturing-target shape, and the generating the machining path, and where a difference in volume between the redundant manufacturing-target shape and the manufacturing-target shape is used as an evaluation function and where number of the linear beads and a manufacturing condition of the linear bead are defined as a variable, the redundant manufacturing-target shape is set such that a volume of the redundant shape is smaller than a predetermined threshold.

4. The machining-path generation method according to claim 1, wherein the target surface is a surface of a workpiece.

* * * * *